Figure 1:
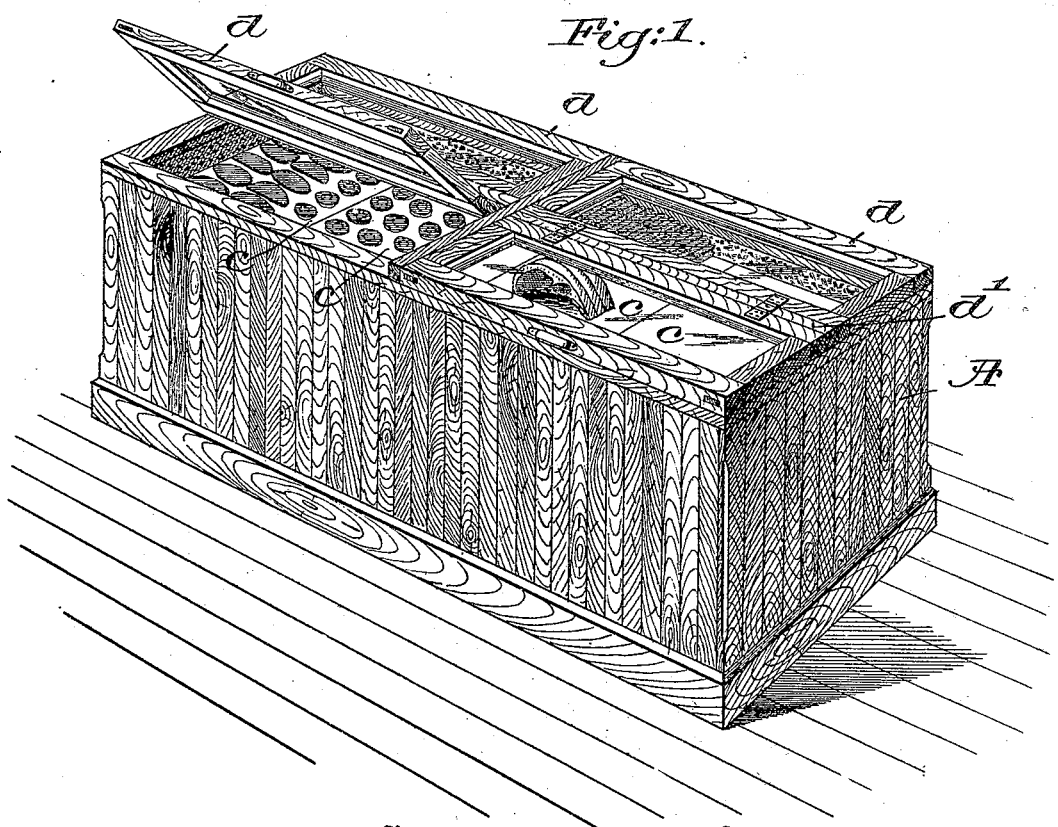

(No Model.)

F. U. WARNER.
DISPLAY REFRIGERATOR.

No. 515,182.  Patented Feb. 20, 1894.

Witnesses.
A. C. Harmon
Thomas J. Drummond

Inventor.
Frank U. Warner
by Crosby & Gregory
attys.

UNITED STATES PATENT OFFICE.

FRANK U. WARNER, OF BOSTON, MASSACHUSETTS.

DISPLAY-REFRIGERATOR.

SPECIFICATION forming part of Letters Patent No. 515,182, dated February 20, 1894.

Application filed October 27, 1893. Serial No. 489,325. (No model.)

*To all whom it may concern:*

Be it known that I, FRANK U. WARNER, of Boston, county of Suffolk, State of Massachusetts, have invented an Improvement in Display-Refrigerators, of which the following description, in connection with the accompanying drawings, is a specification, like letters on the drawings representing like parts.

In the purchase and sale of meats and the like for household use, purchasers at the present time are growing more and more to demand the privilege of making a selection from a large number of previously cut pieces, instead of, as formerly, requiring each his own particular order or piece cut for him. This growing practice makes it obligatory on the part of the dealer to keep on hand at all times, a large number of cut pieces of varying sizes and cuts from which the purchaser may make his selection. It is well known, however, that cut meat deteriorates or spoils very quickly even in the most approved form of refrigerator, hence the difficulty of keeping the same exposed to view without great financial loss to the dealer.

In my studies and experiments to devise a display refrigerator in which cut meats might be kept on view for a considerable length of time without deterioration, I have found that if the meats be placed in usual plates or platters and the latter placed directly upon ice, the presence and circulation of air around the plate or platter and between the same and the ice beneath, causes the ice to quickly melt and the meat to as quickly deteriorate. On the other hand, if the meat be laid out flat upon the ice itself, the latter quickly absorbs from the meat much of its juice and nutritious matters, rendering the latter practically worthless. I have, however, discovered that by tightly packing the ice in large quantities in a suitable chest, and covering the ice with one or more flat slabs of marble or other equivalent conducting material or stone, each slab resting squarely upon or embedded in the ice and fitting the sides of the chest substantially tight on all sides, thereby excluding all air from the ice, the slices or pieces of meat or other like articles laid upon the slabs may be kept for a considerable length of time, at least forty-eight hours, even though they be exposed to view beneath glass doors which are frequently opened.

This invention broadly therefore consists in the herein described display refrigerator consisting of an ice receiving chest adapted to be packed tightly with ice to within a short distance of its top; one or more substantially flat stone display slabs adapted to rest directly upon said ice and at their edges fitting each other and the side of the chest to thereby exclude substantially all air from beneath the said slabs; one or more openings through which said slabs are exposed to view; and a door to permit access to said chest above said slabs, substantially as will be described.

Figure 2:
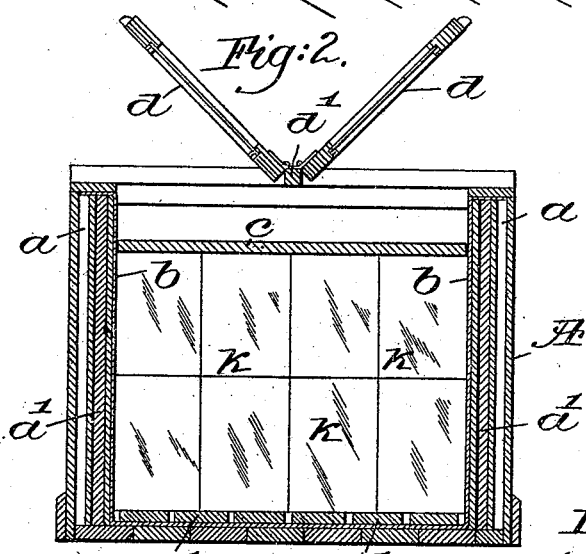

Figure 1 of the drawings is a perspective view of the preferred form and construction of refrigerator embodying this invention; and Fig. 2, a vertical cross section of the same.

Referring to the drawings, A represents a preferably open top refrigerator chest having suitably constructed side walls, the same in the present instance having an air space $a$, and a space filled with tan $a'$, or other non-conducting material, or the said walls may be otherwise constructed to prevent as far as possible melting of the ice within. The chest is lined in suitable manner as with galvanized iron or zinc $b$, as shown, and within this lined chest and preferably upon suitable narrow supporting strips $b'$, I pack the ice in squares or cakes $k$, the ice being packed as tightly and closely as possible and finally shaved off at its upper surface to present a perfectly flat continuous surface, any chinks or openings between the large cakes being filled in with small pieces to make the whole as nearly as possible one large solid mass or cake of ice. Upon the upper flat surface of this mass of ice, I place one or more, preferably several, large flat slabs $c$ of marble, slate, soapstone, or other like or suitable stone-like material, the slabs at their edges fitting closely each other and the zinc lined chest to thereby exclude substantially all air from the chest below the slabs, they being sufficiently loose only to rise and fall within the chest, with the ice on which they rest. The refrigerator at its top is closed preferably by glazed doors or covers as $d$, $d$, shown as hinged to a central removable strip $d'$, and provided with suitable lifting handles, and if need be with fastening devices, though the latter are not here shown, whereby the said covers or doors may be turned upward on their hinges to permit access to the interior of the chest. The slices or pieces of cut meat and other articles to be preserved while on view, are arranged as shown upon the slabs c, in practice each being marked with its proper price to better enable the customer to make proper selection. It will be evident that none of the juice or nutritious elements of the meat can be lost or absorbed by the ice or the slabs, and the meats when placed flat upon the slabs may be kept sweet for two or three days in warm weather, and for a much longer period in cold weather. The slabs when first placed upon the ice quickly embed themselves upon and in the same, and by fitting the chest tightly exclude substantially all air, so that during the warm summer months a medium sized chest will run for several days without filling, and in winter months will run for several weeks. As the ice gradually shrinks and melts, the slabs, always resting upon the same, are free to fall therewith, so that there never can be any air between the slabs and the ice, keeping the former always intensely cold for the preservation of the meats. The slabs c, c, are removed when it becomes necessary to fill the chest with ice, the strip d', with the doors c, c, being also preferably removed to better enable the large cakes of ice to be packed.

Any water from the melting ice is drawn off through a suitable outlet not shown.

The invention is not restricted to the particular construction or shape of chest herein shown, for the same may be varied without departing from the invention.

By the phrase "slabs resting directly upon the ice" employed in the claim is meant that the slabs rest upon and are supported by the ice so as to fall with the ice as the latter melts, as distinguished from slabs supported by cleats or other pieces attached to the inner sides of the refrigerator.

Were the slabs supported by the walls of the refrigerator instead of by the ice they would have no opportunity to embed themselves in the ice and as the ice melted it would fall away from the slabs and permit air from the sides to enter between, which would cause the ice to melt with greater rapidity. By supporting the slabs upon the ice itself so as to prevent air from the sides entering between the slabs and the ice, the latter is prevented from melting rapidly and the slabs are kept as cold as possible.

I claim—

The herein described display refrigerator consisting of an ice receiving chest adapted to be packed tightly with ice to within a short distance of its top; one or more substantially flat stone display slabs adapted to rest directly upon said ice and at their edges fitting each other and the side of the chest to thereby exclude substantially all air from beneath said slabs; one or more openings through which said slabs are exposed to view, and a door to permit access to said chest above said slabs, substantially as described.

In testimony whereof I have signed my name to this specification in the presence of two subscribing witnesses.

FRANK U. WARNER.

Witnesses:
FREDERICK L. EMERY,
EMMA J. BENNETT.